United States Patent
Wang (10) Patent No.: US 6,840,157 B2
(45) Date of Patent: Jan. 11, 2005

(54) COFFEE APPARATUS WITH VACUUM-FRESH COFFEE BEANS

(76) Inventor: Dong Ming Wang, No. 4 Bldg., Pinglanyuan Industrial Region, 519060 Nanping town, Zhuhai, Guangdong (CN)

( * ) Notice: Subject to any disclaimer, the term of this patent is extended or adjusted under 35 U.S.C. 154(b) by 128 days.

(21) Appl. No.: 10/215,255

(22) Filed: Aug. 8, 2002

(65) Prior Publication Data

US 2004/0025703 A1 Feb. 12, 2004

(51) Int. Cl.[7] .................. A47J 31/00; A23N 12/10; A23L 1/00; B02C 19/12
(52) U.S. Cl. ................. 99/286; 99/290; 241/33; 222/53
(58) Field of Search .................. 99/275, 286, 290, 99/287; 241/33, 34, 38, 36; 222/53, 152

(56) References Cited

U.S. PATENT DOCUMENTS 5,871,120 A * 2/1999 Romero et al. ............... 222/53
6,349,889 B1 * 2/2002 Sandolo ....................... 241/34

FOREIGN PATENT DOCUMENTS

EP 0470254 * 2/1992

* cited by examiner

Primary Examiner—Reginald L. Alexander
(74) Attorney, Agent, or Firm—Herbert Dubno (57) ABSTRACT

A coffee apparatus comprises a coffee grinder which receives the coffee beans from a chamber which has a hermetically-sealed lid and a manually-operable venting valve, a sealing assembly for the outlet of the chamber, a vacuum pump capable of evacuating the chamber and a pressure switch connected to the vacuum pump and the chamber by a T-connector for turning on the pump to maintain a vacuum in the chamber when pressure in the chamber rises.

18 Claims, 10 Drawing Sheets

A SEALED POSITION   AN UNSEALED POSITION

COFFEE APPARATUS WITH VACUUM-FRESH COFFEE BEANS

FIELD OF THE INVENTION

My present invention relates to a coffee apparatus, e.g. a coffee grinder, coffee maker or combination coffee grinder and coffee maker, having a compartment for coffee beans which is maintained under vacuum to keep the coffee beans fresh.

BACKGROUND OF THE INVENTION

In the production of coffee beverages for the home or for commercial and institutional purposes, it is a common practice to grind the coffee beans to thereby freshly prepare the coffee grounds for contact with the water to produce the beverage. This method increases the palatability of the beverage by comparison with beverages made from ground coffee prepared at an earlier point in time. However, the problem of maintaining the roasted coffee beans in a fresh state has remained. By and large, the approach taken heretofore to maintain the coffee beans in a fresh state has been to store the coffee beans in a hermetically-sealed or similar container. Usually only the quantity of coffee beans which are needed to prepare the beverage at one time is removed from the container. Otherwise the coffee beans tend to accumulate moisture and produce a beverage which is somewhat lacking in taste.

OBJECTS OF THE INVENTION

It is the principal object of the present invention to provide a coffee apparatus whereby the coffee beans can be maintained in a fresh state for extended periods of time.

Another object of this invention is to overcome drawbacks of earlier coffee-making devices.

SUMMARY OF THE INVENTION

These objects and others which will become apparent hereinafter are attained, in accordance with the invention in a coffee apparatus which comprises:

a housing formed with a chamber for storing coffee beans and a compartment for receiving ground coffee;

a grinder in the housing having an inlet communicating with the chamber for receiving coffee beans therefrom and an outlet for discharging ground coffee into the compartment;

a suction pump having an intake connected to the chamber for evacuating the chamber and maintaining the beans fresh under vacuum; and a pressure switch assembly responsive to the pressure in the chamber and connected to the suction pump for automatically activating the suction pump upon an increase in pressure in the chamber.

The reference to a coffee apparatus here is intended to identify both a coffee-making apparatus, i.e. one which can contact the ground coffee with water to produce the beverage and a coffee-grinding apparatus which produces the ground coffee but does not necessarily contact a portion of the ground coffee with water.

In either type of apparatus, according to the invention, a chamber containing the coffee beans can be provided above the grinder and the communication between that chamber and the grinder can be sealed so that the coffee bean chamber itself forms a hermetically-sealed space within the housing and to which the intake side of the suction pump is connected.

According to a feature of the invention, the intake side of the suction pump is connected to one passage of a three-passage connector, another passage of which is connected by a rubber tube or the like with the coffee-bean chamber while a third passage is connected, e.g. by another rubber tube, with the pressure switch. The coffee-bean chamber, in turn, can be provided with a lid hermetically sealed to the rim of the chamber and equipped with a manually-operable pressure-relief valve which can release the pressure within the coffee-bean chamber, for example, for addition of a supply of coffee beans thereto when the contents of that chamber is depleted.

According to a further feature of the invention, the coffee bean chamber is formed with a hopper delivering the coffee bean to the inlet of the grinder through an outlet of the chamber which is provided with a seal and a closure element electromagnetically actuated to deliver the coffee beans to the grinder in one position of the electromagnetic actuator and sealing the outlet of the coffee-bean chamber in another position of the electromagnetic actuator. The sealing member can be swingable or slidable and can be biased into the sealing position by a spring.

The controls for the apparatus can include a switch which can be deemed to be a fresh-keeping switch and which controls the auction pump and can cut off the suction pump manually when opening of the coffee bean chamber is desirable. Preferably a filter is provided between the intake to the suction pump and the coffee bean chamber.

BRIEF DESCRIPTION OF THE DRAWING

The above and other objects, features, and advantages will become more readily apparent from the following description, reference being made to the accompanying drawing in which.

SPECIFIC DESCRIPTION

As will be apparent from a comparison of FIGS. 1–4 with FIGS. 5 and 6 and 7–10, the coffee grinder of the invention can be embodied as a free-standing unit (FIGS. 1–4) or as part of a coffee-making machine (FIGS. 5 and 6 or FIGS. 7–10).

In the embodiment of FIGS. 1–4 the coffee grinder comprises a chamber 2 for roasted coffee beans, a cover or lid 1 which is hermetically sealed to the coffee-bean chamber 2, e.g. via a sealing ring 8, a coffee-powder hopper adapted to receive the ground coffee, and a casing 4 which supports the coffee-bean chamber 2, the lid 1 and the coffee-powder hopper 3. The lid may be removed from the casing 4 to permit the ground coffee to be introduced into a filter of a drip-coffee maker or to be placed in the ground-coffee receptacle of another type of coffee maker.

Figure 1:
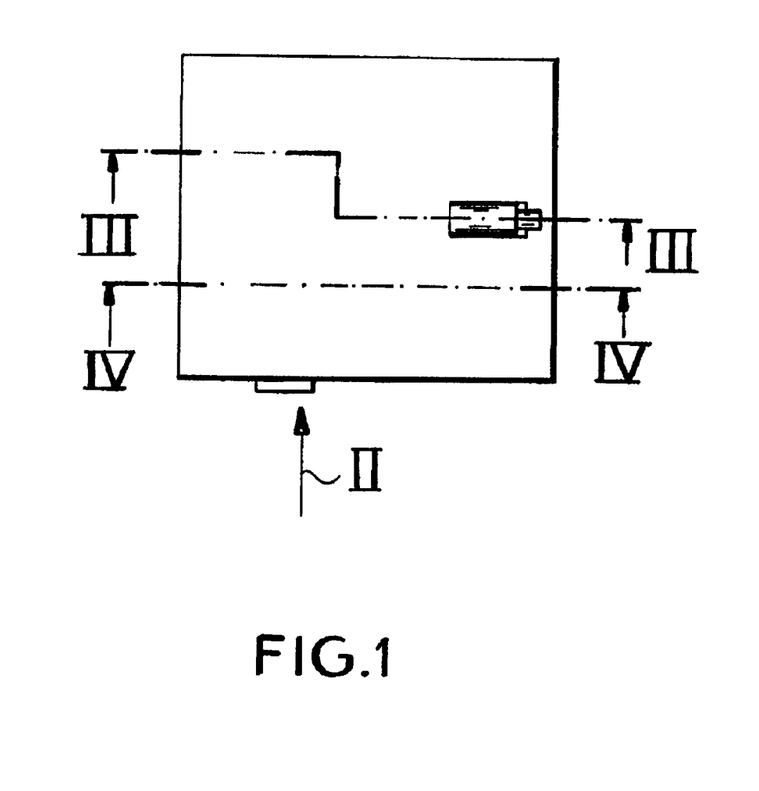
FIG. 1 is a diagrammatic plan view of a coffee grinder according to the invention showing the position of certain parts thereof.
Figure 2:
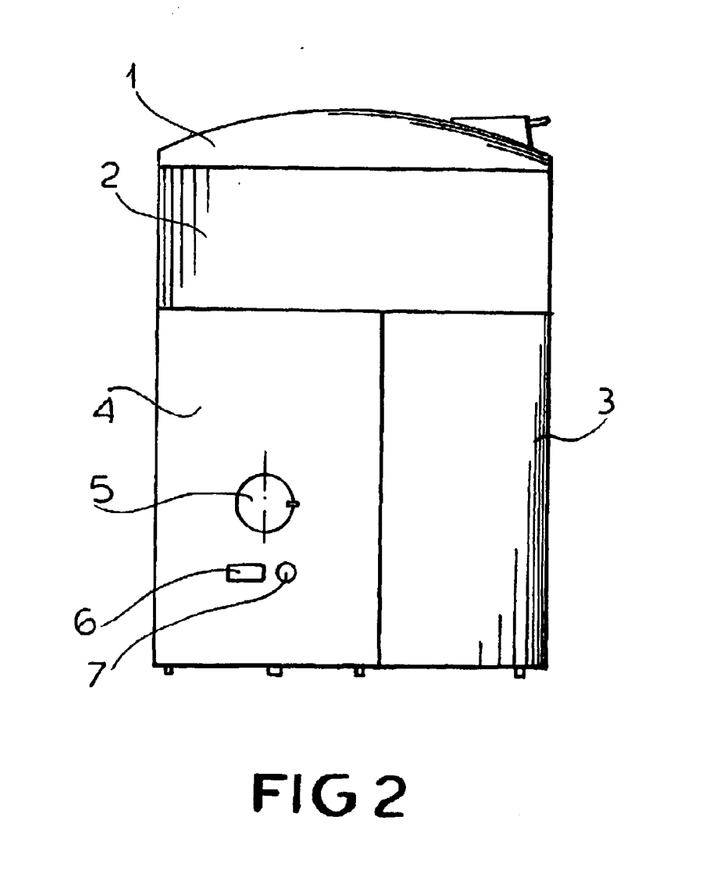
FIG. 2 is a diagrammatic elevational view seen in the direction of the arrow II of FIG. 1.

Mounted on the casing 4 is a grinding timer 5 which has been shown only diagrammatically in FIG. 2 and serves to turn on the grinder motor for a period of time set by the user with the aid of this timer. The grinding motor has been represented at 11 and is mounted within the casing 4 and drives a grinder blade 9.

Figure 11:
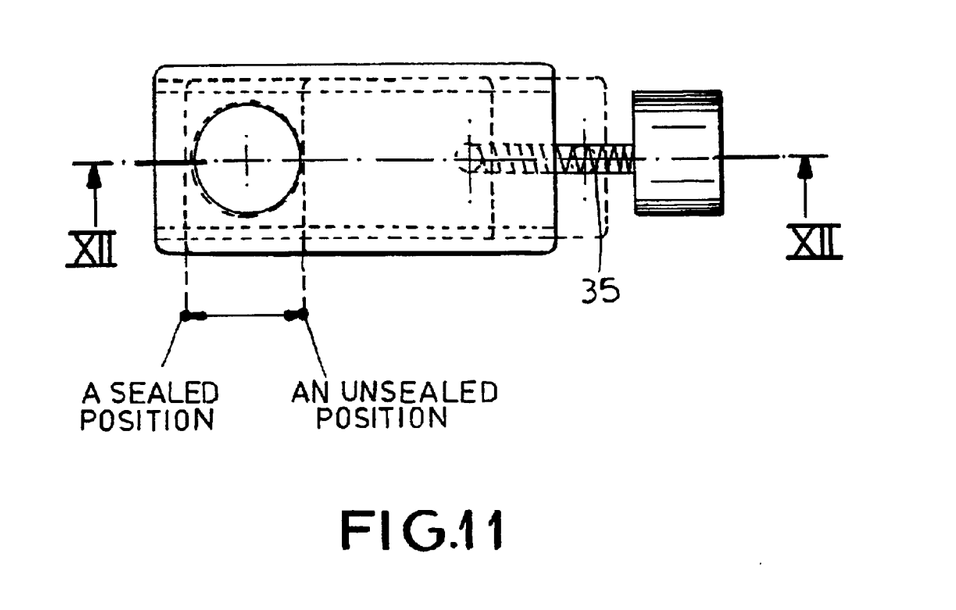
FIG. 11 is a bottom view of the seal for the coffee-bean chamber in one embodiment of the invention.
Figure 12:
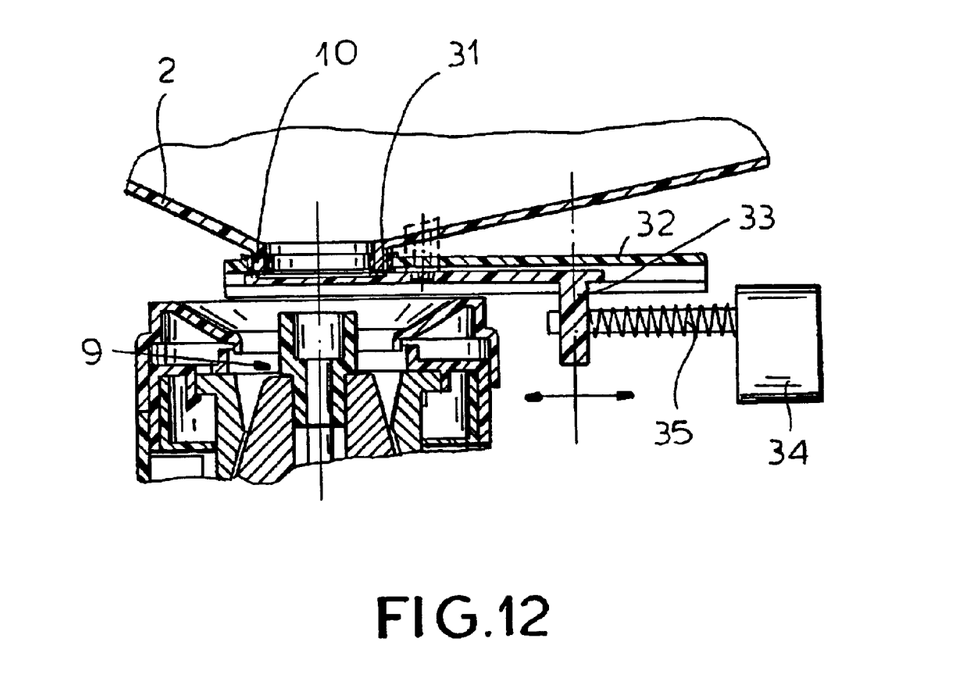
FIG. 12 is a cross sectional view through the lien XII—XII of FIG. 11.
Figure 13:
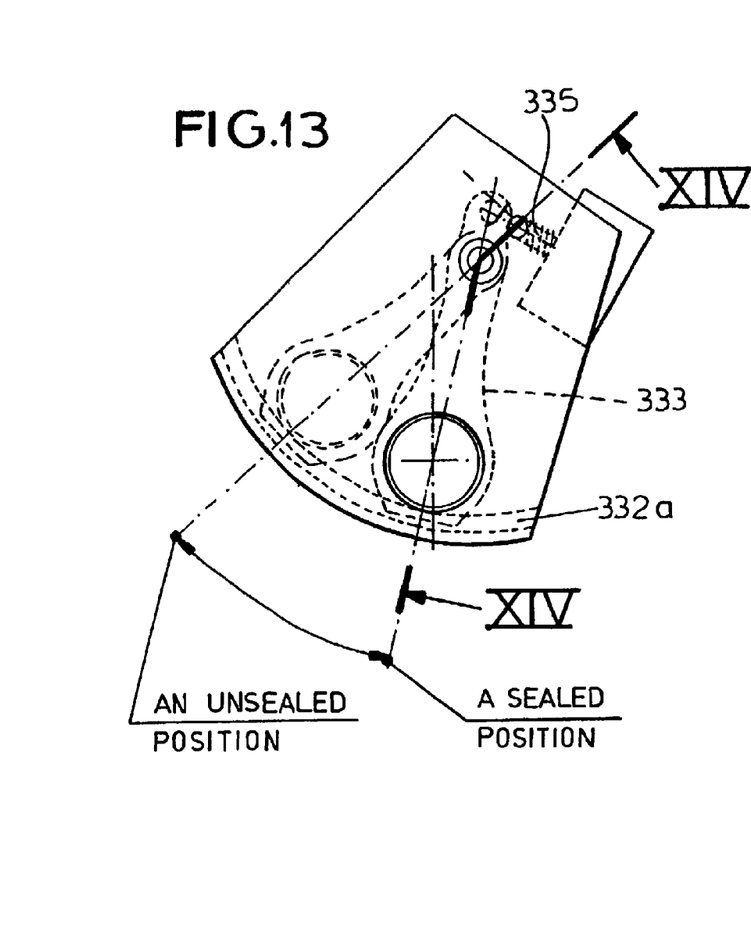
FIG. 13 is a view similar to FIG. 11 showing an embodiment in which the sealing member is swingable.
Figure 14:
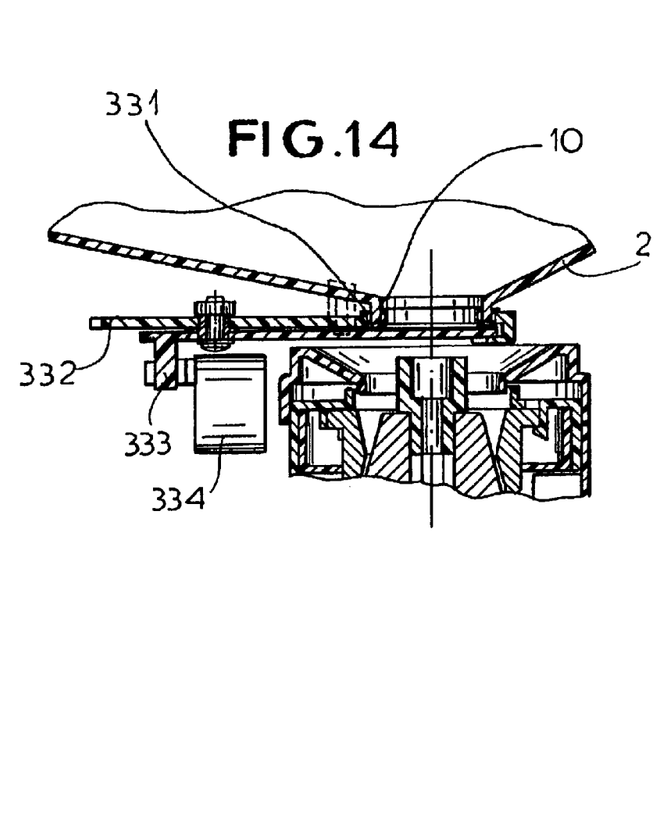
FIG. 14 is a view similar to FIG. 12 but of the sealing system of FIG. 12 and corresponding to a section along the lien XIV—XIV of FIG. 13.

To be able to maintain a vacuum in the chamber 2, the chamber 2, which is formed with a funnel-shaped hopper 2a has an outlet 10 which can be sealed by an assembly such as that shown in FIGS. 11 and 12 or by an assembly as shown in FIGS. 13 and 14. This assembly forms part of an evacuating system for the chamber 2 which includes a vacuum pump 16 driven by a motor 16a (FIGS. 3 and 4) and which can be of a conventional construction. The vacuum pump has its suction side connected to one passage of a three-passage or T-connector 15, also referred to as a tri-connector.

Figure 3:
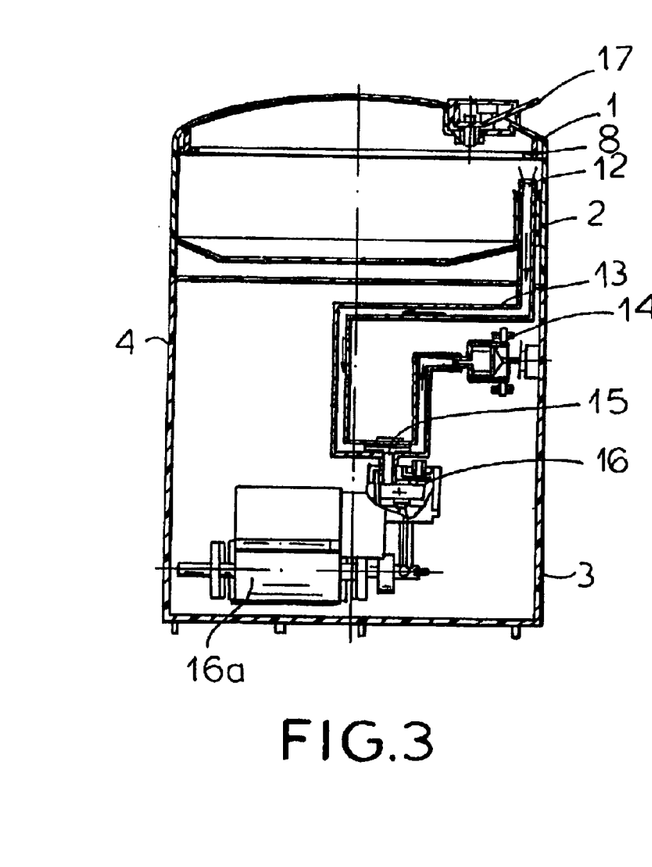
FIG. 3 is a cross sectional view taken along the line III—III of FIG. 1.
Figure 4:
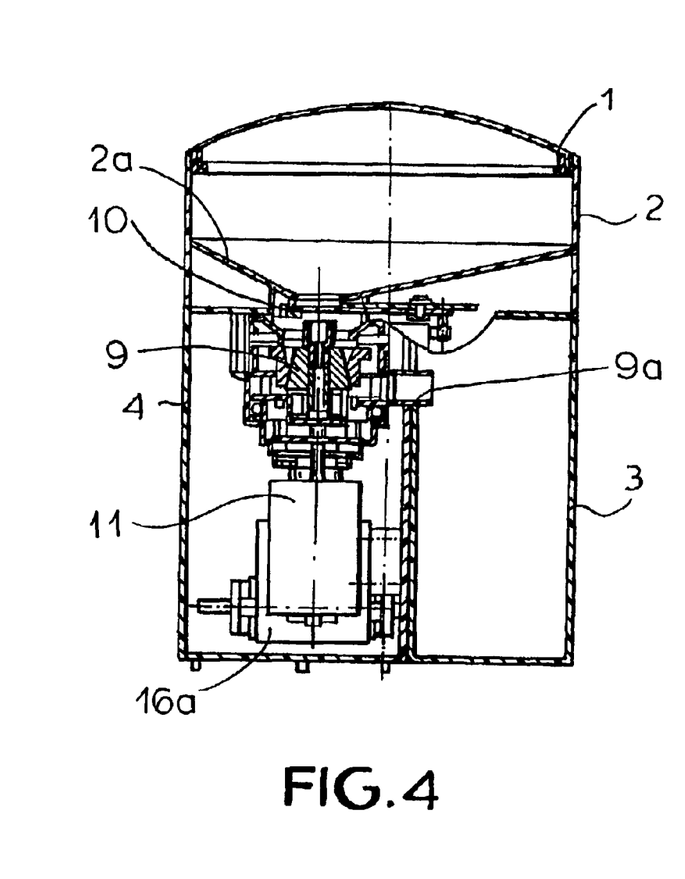
FIG. 4 is a cross sectional view taken along the line IV—IV of FIG. 1.

A rubber conduit 13 is connected to one arm of the T-connector 15 and opens into the coffee-bean chamber 2 via a filter 12. Another arm of the tri-connector 15 is connected to a pressure switch assembly 14 (FIG. 3). The cover or lid 1 is provided with a manual-release valve 17.

As with all of the embodiments described here, the pressure switch 14 measures the suction developed in the chamber 2 and upon a rise in pressure above a certain threshold, will turn on the suction pump 16 to evacuate the chamber 2 further. When the chamber 2 must be opened, valve 17 is released to vent the chamber and allow the cover or lid 1 to be removed. The outlet 10 can be unblocked when the grinder motor 11 is actuated to allow coffee beans to fall into the grinder 9,11 and to be discharged form the blade arrangement at 9a into the ground coffee bin 3.

Figure 5:
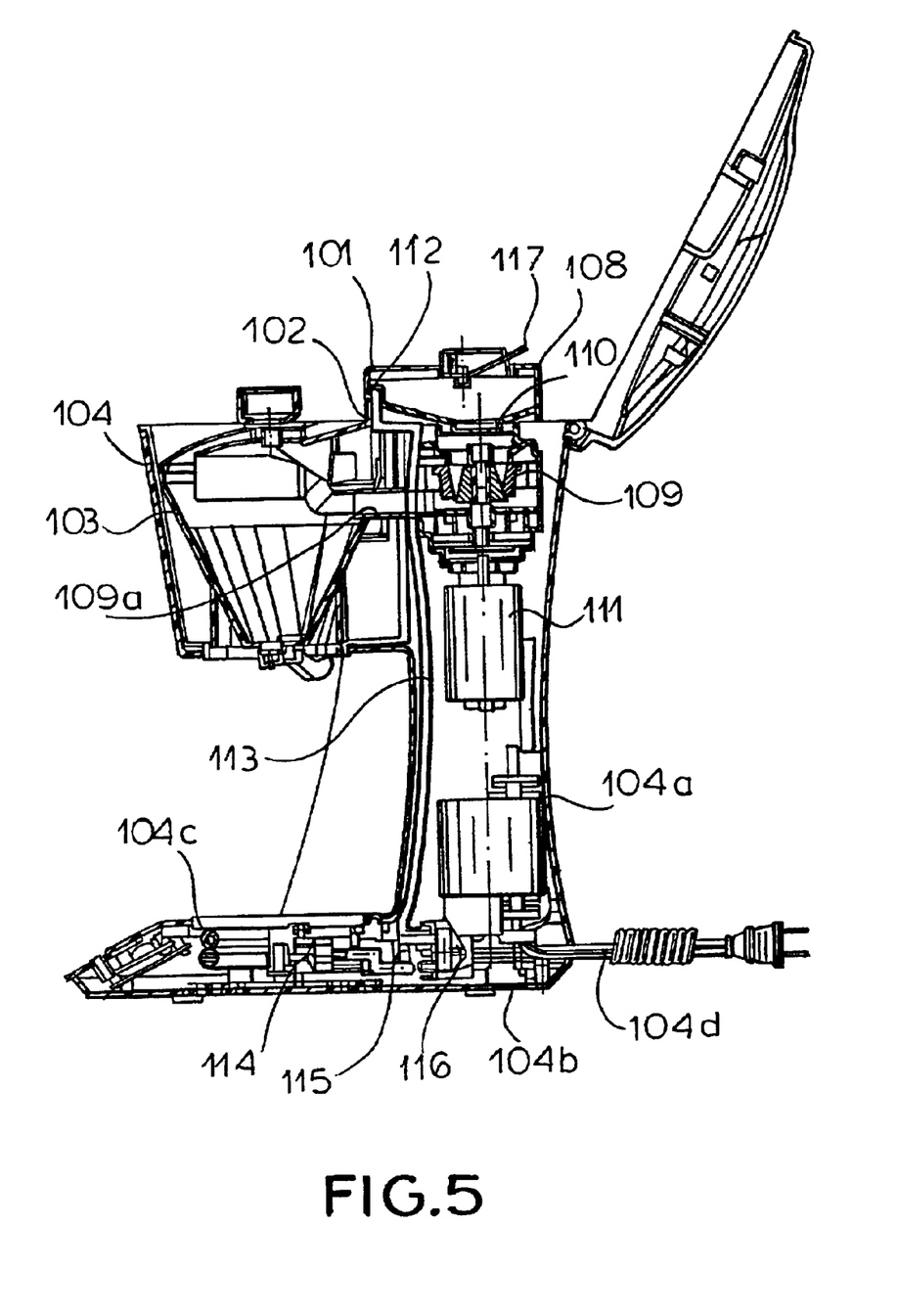
FIG. 5 is a vertical section through a drip-type coffee making machine utilizing the grinder system of the invention.
Figure 6:
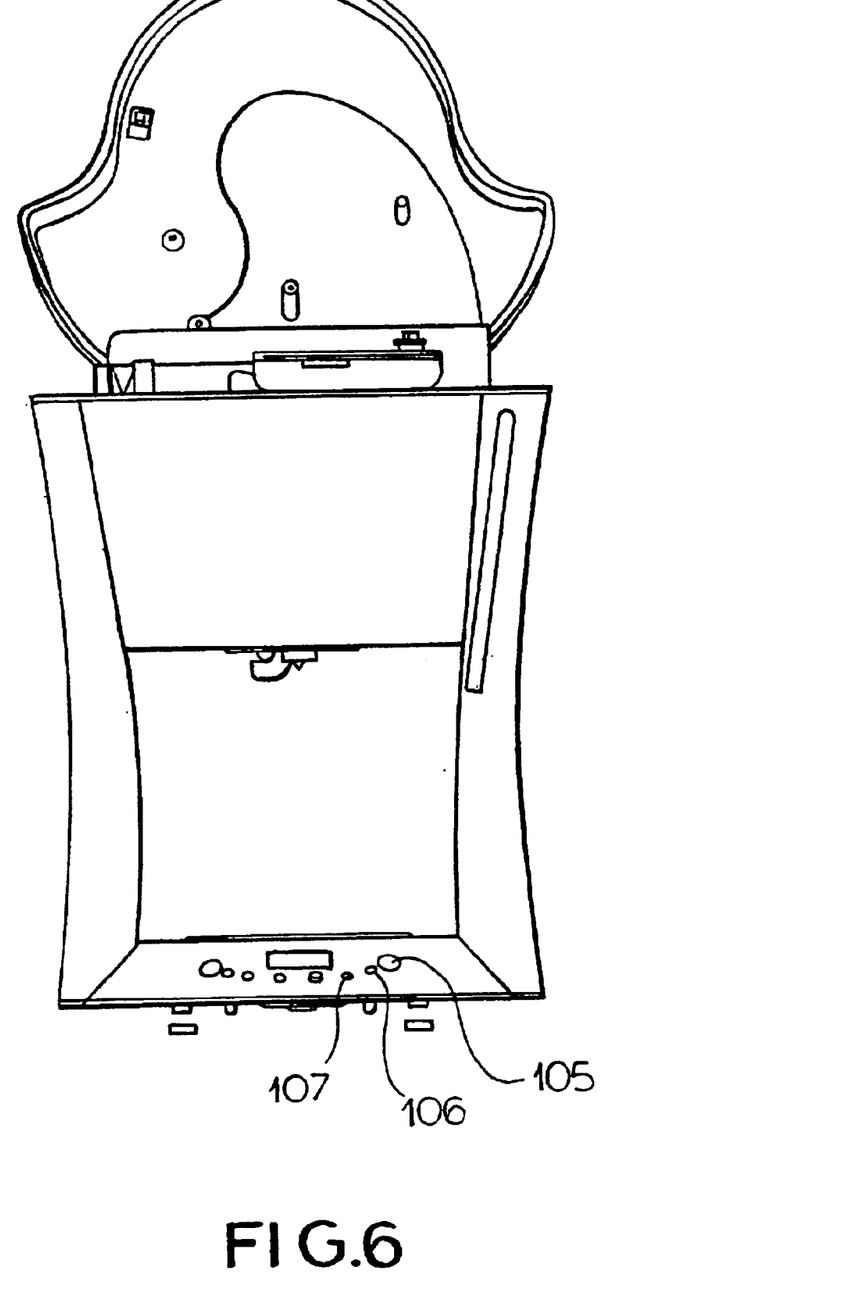
FIG. 6 is a front elevational view thereof.
Figure 7:
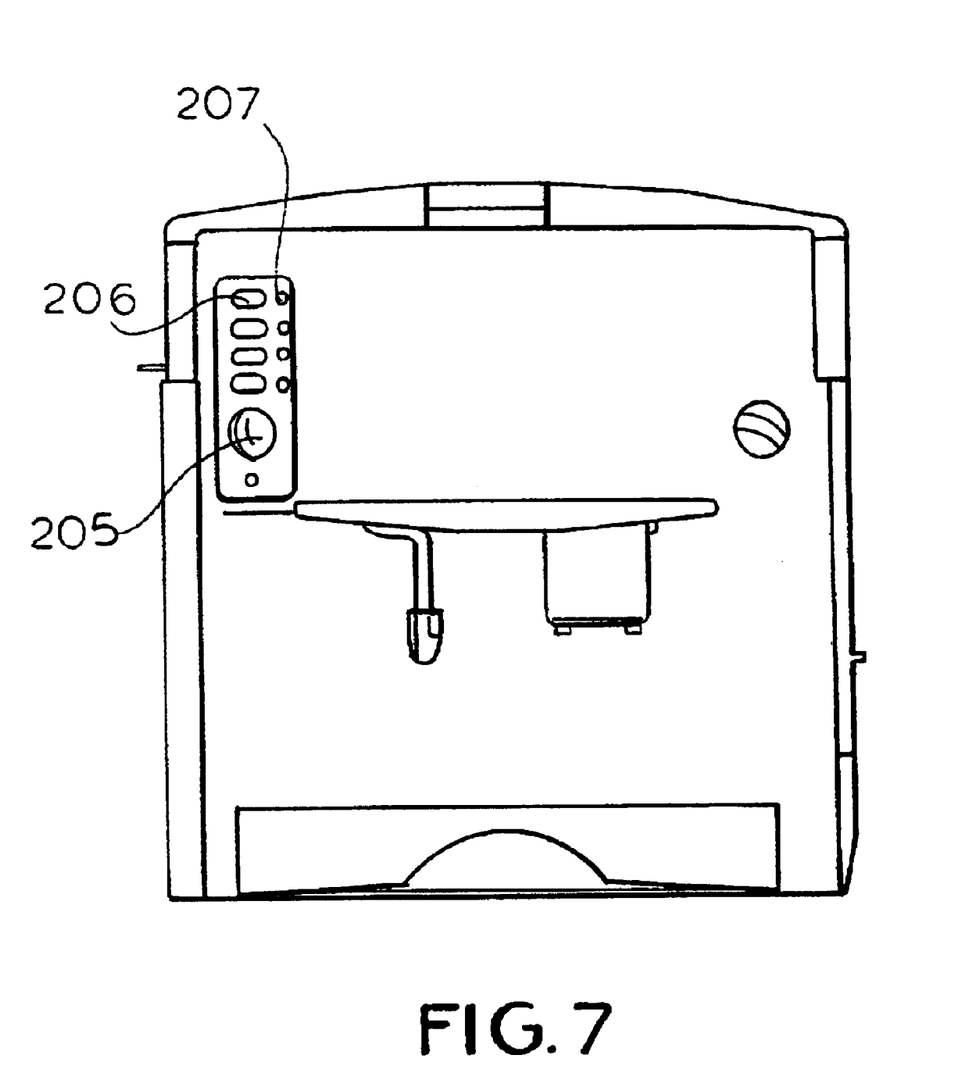
FIG. 7 is a front elevational view of another coffee-making machine in which only the grinder part has been shown in detail.
Figure 8:
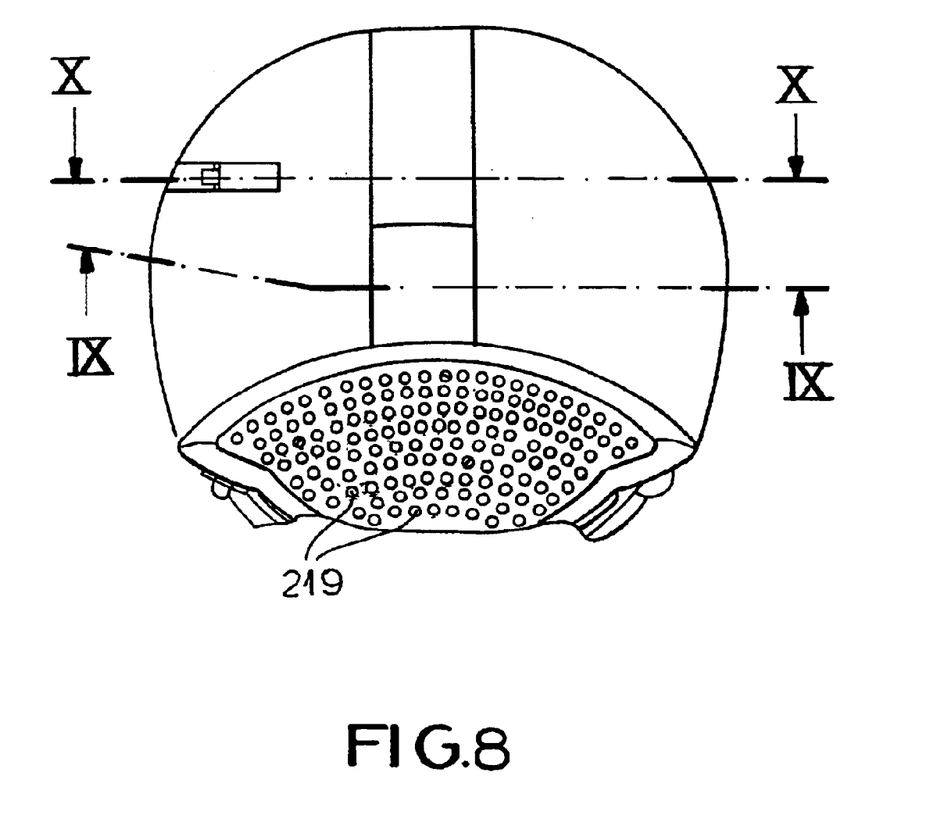
FIG. 8 is fragmentary plan view thereof.
Figure 9:
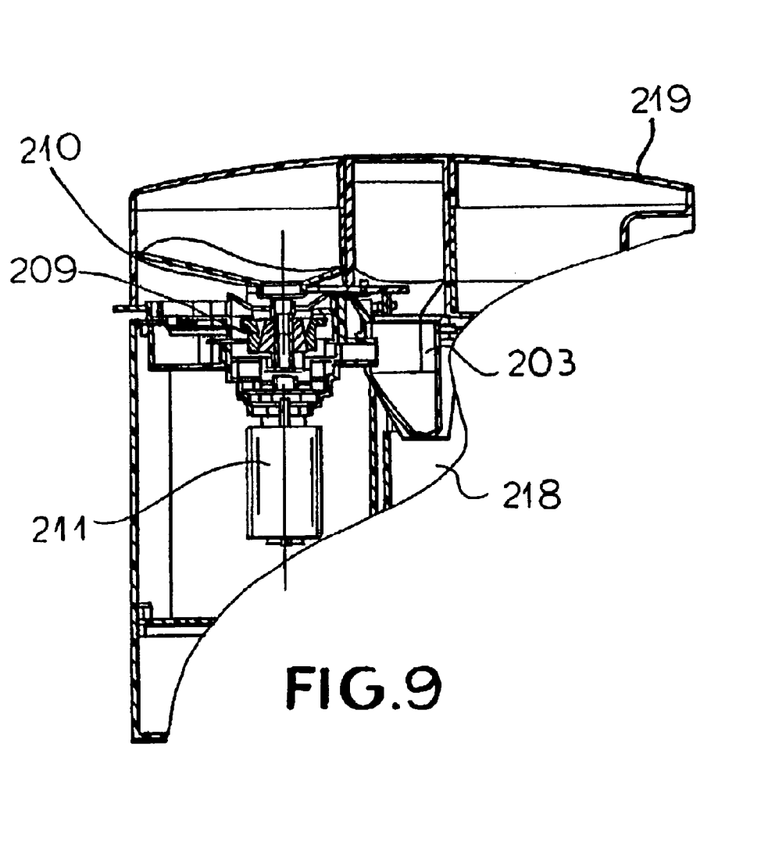
FIG. 9 is a cross sectional view, partly broken away taken along the line IX—IX of FIG. 8.
Figure 10:
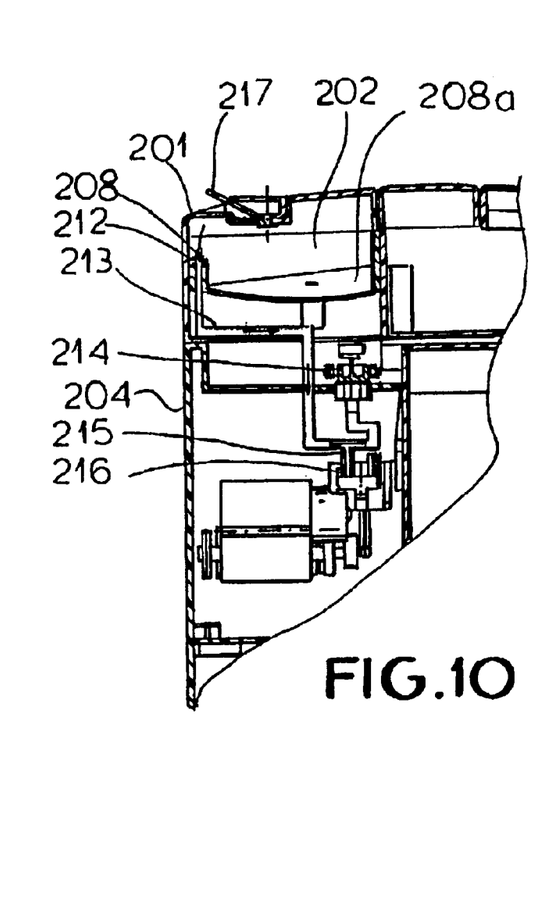
FIG. 10 is a fragmentary cross sectional view taken along the line X—X of FIG. 8.

In the coffee-maker embodiment of FIGS. 5 and 6, the coffee maker has a stand 104a which can be mounted upon a base 104b provided with a heating element 104c for a container adapted to received the brewed coffee. The means for introducing hot water to the ground coffee is not shown and is conventional and the coffee maker can be connected to an electric-supply line 104d as is also conventional. The stand 104a may have a cover 104e which can be decorative or functional and can cover the grinder assembly and the elements which form counterparts to those of FIGS. 1–4. For example, the grinding blade is here represented at 109 and delivers the coffee via outlet 109a into a ground-coffee container 103 which may be a filter for brewing the coffee.

The coffee-bean chamber 102 is provided with a lid 101 with a seal 108 as in the embodiment of FIGS. 1–4, and has an outlet 110 which can be provided with a sealing structure as shown in FIGS. 11 and 12 or as shown in FIGS. 13 and 14. The suction pump 116 is provided with a tri-connector 115 connected via the rubber tube 113 to the coffee-bean chamber 2 via a filter 113 while the pressure switch is shown at 114. The grinder motor can be seen at 111 and the casing for the grinder assembly at 104. A manually-operated switch 117 allows venting of the chamber 102 for release of the lid. At 105 there is shown a grinding light which serves the function of timer 105 and displays the duration of the grinding operation.

A fresh-keeping indicator is represented at 107 and a fresh-keeping switch at 106. The indicator 106 has its equivalent in member 6 of FIG. 2 while the fresh-keeping indicator of this embodiment is shown at 7 in FIG. 2.

FIGS. 7–10 show a third embodiment in which the lid 201 of the coffee grinder portion of the apparatus is also provided with a manually-operable valve 217 and seals against the rim of the coffee-bean chamber 202 with a sealing ring 208. The chamber 202 is formed with a funnel-shaped bottom 208a provided with a sealing assembly at its outlet 210 as illustrated in FIGS. 11 and 12 or FIGS. 13 and 14.

The ground coffee is collected in a hopper 208 which supplies the ground coffee to the coffee-making portion of the apparatus represented at 218 and having a perforated cover 219 through which water can be introduced. The details of the coffee-making portion of the apparatus have not been provided and can be conventional. In this embodiment as well, a suction pump 216 has a tri-connector 215, one arm of which is connected to a pressure switch 214 while the other arm is connected to the tube 213 which opens into the chamber 202 via the filter 212. The grinder blade 209 is driven by the motor 211 as has been previously described and the grinder and the suction pump are received in the casing 204. The timer 205 for the grinder has been shown in FIG. 7 along with the fresh-keeping indicator 207 and the fresh-keeping switch 206.

The sealing assembly for the outlet 10, 110 or 210 of the chamber 2, 102, 202 can use a linearly-displaceable slide 33 which is connected to an electromagnetic actuator 34 capable of displacing the slide 33 against the force of a resetting spring 35. The slide 33 bears against the underside of a sealing ring 31 surrounding the outlet 10. The slide 33 is guided by a fixed plate 32. In operation, to enable the coffee beans to be delivered to the grinder blade 9, 109, 209, the slide 33 is drawn to the right by the electromagnetic actuator 34 against the force of the spring 35 so that upon deactivation of the electromagnetic actuator, the slider can return to the position shown in FIG. 12 by the action of the spring 35. In its closed position, the slider seats hermetically against the seal 31.

In the embodiment of FIGS. 13 and 14, the seal 331 at the outlet 10, 110, 210 of the chamber 2, 102, 202 is engaged by a rotary member 333 displaced by a rotary actuator 334 against the force of the resetting spring 335. The rotary member 333, also referred to as an active barrier, is mounted on a fixed plate 332 formed with a channel 332a forming a guide for the free end of member 333.

In this system, the member 333 is swung from its sealed position to its unsealed position to allow the coffee beans to drip into the grinder blades.

In the embodiments of both FIGS. 11 and 12 and FIGS. 13 and 14, the electromagnetic actuator is connected to a control circuit and the electromagnetic actuator is turned off when the fresh-keeping switch 6, 106, 206 is turned on. The active barrier is then returned by the spring 35, 335 to the sealed position and seals the chamber 2, 102, 202 to prevent further coffee beans from dropping into the blades.

When the fresh-keeping switch 6, 106, 206 is turned off, the member 33 or 333 is shifted from its sealed position to its unsealed position, enabling grinding to occur and permitting the opening of the grinder lid by manual operation of the valve 17, 117, 217.

Figure 15:
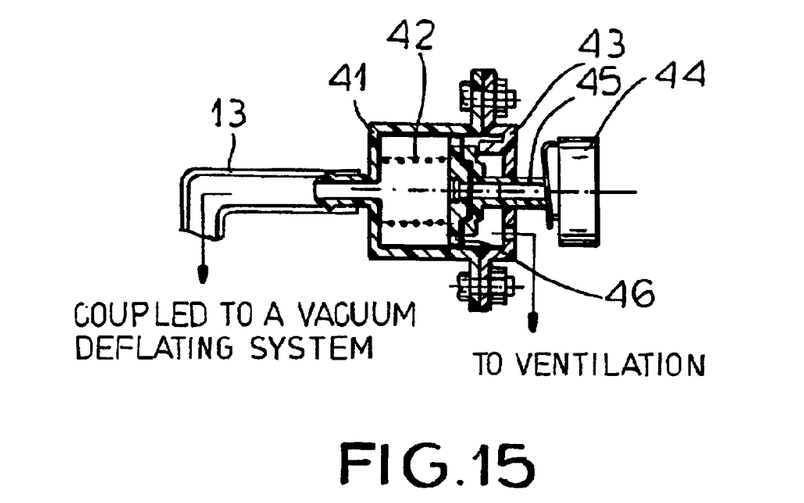
FIG. 15 is a cross sectional view through the pressure switch of the invention showing the vacuum pump circuit in the "on" position.
Figure 16:
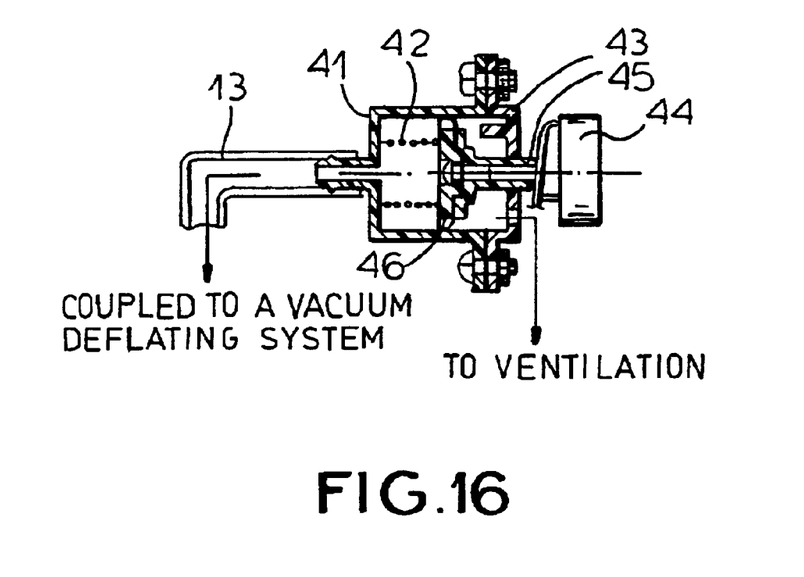
FIG. 16 is a cross sectional view of the pressure switch showing the pump circuit in the "off" position.

The pressure switch 14, 114, 214 has been shown in greater detail in FIGS. 15 and 16. FIG. 15 shows the switch in its closed circuit or "on" position while FIG. 16 shows the switch in its open or "off" position.

The pressure switch is connected to the tube 13 and comprises a valve body 41, a piston 46 displaceable in the valve body, a compression spring 42 bearing upon the piston and a lid 43 connected to the valve body. The piston 46 is connected by a stem 45 to a microswitch 45.

The microswitch is connected to the vacuum-pump circuit and the piston is pressed to the right by the compression spring when the vacuum system is at ambient pressure or at a pressure above that required to keep the coffee in chamber 2, 102, 202 fresh. The microswitch is thus in its "on" position. When the fresh-keeping switch 6, 106, 206 is turned on, the vacuum pump draws a vacuum in this chamber and in the body 41. When that vacuum is sufficient, the piston 46 is drawn to the left against the force of spring 42 allowing the microswitch 44 to move into its "off" position to cut off the vacuum pump. When the pressure in tube 13 rises, the spring 42 drives the piston 46 to the right to actuate the microswitch 44 and return it to the "on" position (FIG. 15).

I claim:

1. A coffee apparatus comprising:
   a housing formed with a chamber for storing coffee beans and a compartment for receiving ground coffee;
   a grinder in said housing having an inlet communicating with said chamber for receiving coffee beans therefrom and an outlet for discharging ground coffee into said compartment;
   a suction pump having an intake connected to said chamber for evacuating said chamber and maintaining said beans fresh under vacuum; and
   a pressure switch assembly responsive to the pressure in said chamber and connected to said suction pump for automatically activating said suction pump upon an increase in pressure in said chamber.

2. The coffee apparatus defined in claim 1 wherein said chamber is provided with a lid and a seal between said lid and said chamber for hermetically-sealing said lid to said chamber upon application of suction to said chamber.

3. The coffee apparatus defined in claim 2, further comprising a manual valve in said lid actuatable to vent said chamber.

4. The coffee apparatus defined in claim 1 wherein said chamber has an outlet, said apparatus further comprising a sealing assembly for said outlet.

5. The coffee apparatus defined in claim 4 wherein said outlet is aligned on said grinder and adapted to deliver coffee beans thereto.

6. The coffee apparatus defined in claim 5 wherein said assembly comprises a fixed plate extending from said outlet, a slider guided on said fixed plate and sealingly engageable with said outlet, and an electromagnetic actuator connected with said slider for shifting same from a sealed position in which said slider is sealed against said outlet to a position in which said outlet is free to deliver coffee beans to said grinder.

7. The coffee apparatus defined in claim 6, further comprising a resetting spring for returning said slider to said sealed position.

8. The coffee apparatus defined in claim 7, further comprising a rubber sealing ring surrounding said outlet, said slider bearing on said ring.

9. The coffee apparatus defined in claim 5 wherein said sealing assembly comprises a rubber ring surrounding said outlet, a rotary member displaceable from a position in which said member sealingly engages said ring into a position in which coffee beans are free to pass through said outlet into said grinder, and an electromagnetic actuator for rotating said plate between said position.

10. The coffee apparatus defined in claim 9, further comprising a resetting spring acting upon said plate for urging said plate into a position in which said plate seals against said ring.

11. The coffee apparatus defined in claim 1 wherein said pressure switch assembly is provided with a piston displaceable against a spring and connected with a microswitch for automatically switching said microswitch between an "on" position and an "off" position, upon a reduction of pressure in said pressure switch assembly to a level sufficient to maintain coffee beans in said chamber fresh.

12. The coffee apparatus defined in claim 1, further comprising a T-connector having one passage connected to a suction pump, a second passage connected to said pressure switch assembly and a third passage connected to said chamber.

13. The coffee apparatus defined in claim 12, further comprising a rubber tube connecting said third passage to said chamber and opening at a filter into said chamber.

14. The coffee apparatus defined in claim 13 wherein said chamber is provided with a lid and a seal between said lid and said chamber for hermetically-sealing said lid to said chamber upon application of suction to said chamber.

15. The coffee apparatus defined in claim 14 wherein said chamber is provided with an outlet formed with a rubber ring and aligned with said inlet, and a sealing assembly between said outlet and said inlet and including a member displaceable from a sealing position in which said member engages said ring into a position in which said member enables coffee beans to pass from said outlet into said inlet and an electromagnetic actuator for said member shifting said member between said positions.

16. The coffee apparatus defined in claim 15, further comprising a spring urging said member into said sealing position.

17. The coffee apparatus defined in claim 16 wherein said pressure switch assembly is provided with a piston displaceable against a spring and connected with a microswitch for automatically switching said microswitch between an "on" position and an "off" position, upon a reduction of pressure in said pressure switch assembly to a level sufficient to maintain coffee beans in said chamber fresh.

18. The coffee apparatus defined in claim 17 wherein said apparatus is a coffee maker.

* * * * *